Sept. 8, 1931.  G. L. MILLER ET AL  1,822,304
SAFETY OVERLOAD GOVERNOR CUT-OUT SWITCH FOR ELECTRIC MOTORS
Filed July 21, 1928   2 Sheets-Sheet 1
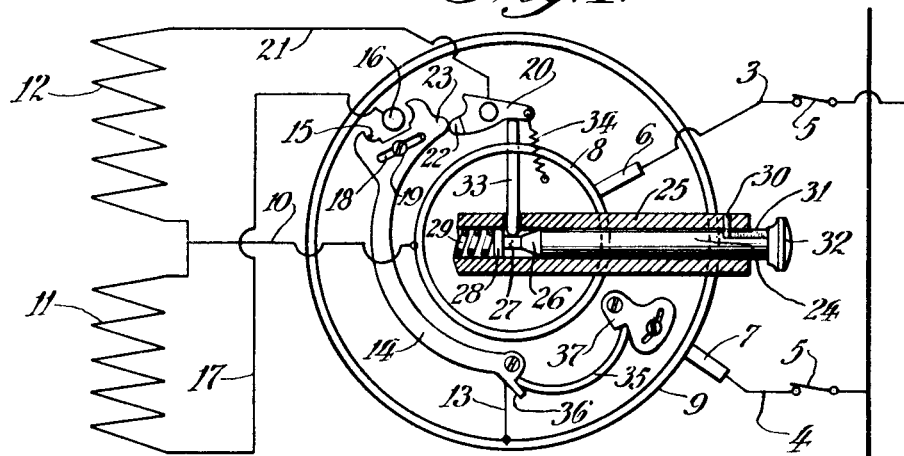
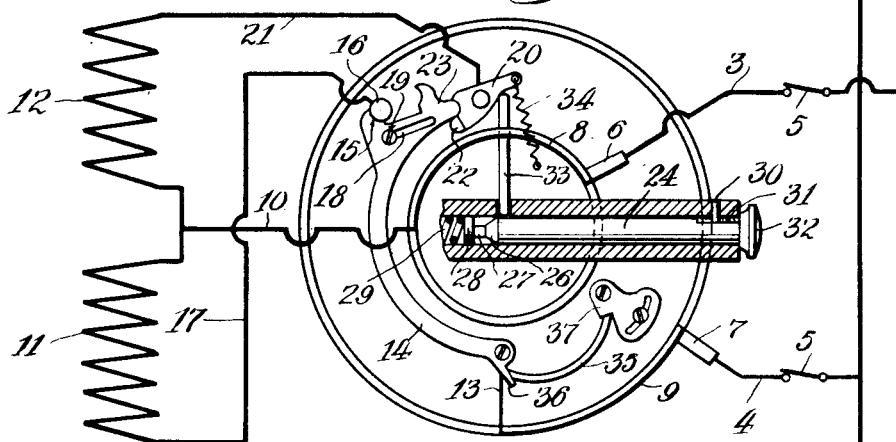
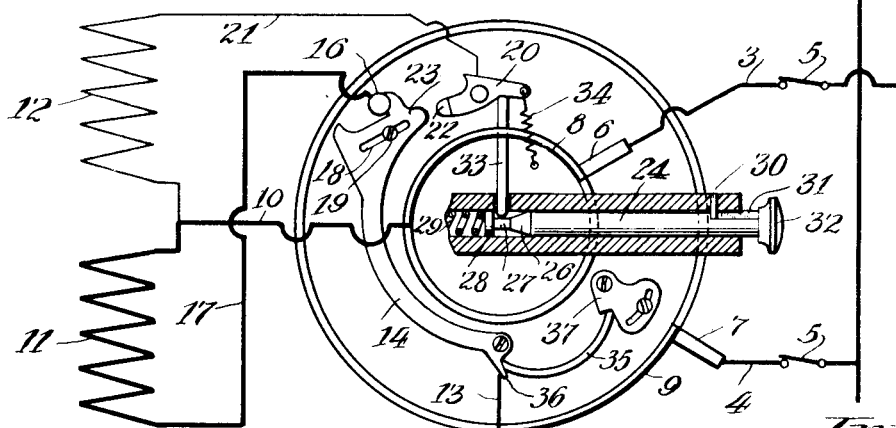

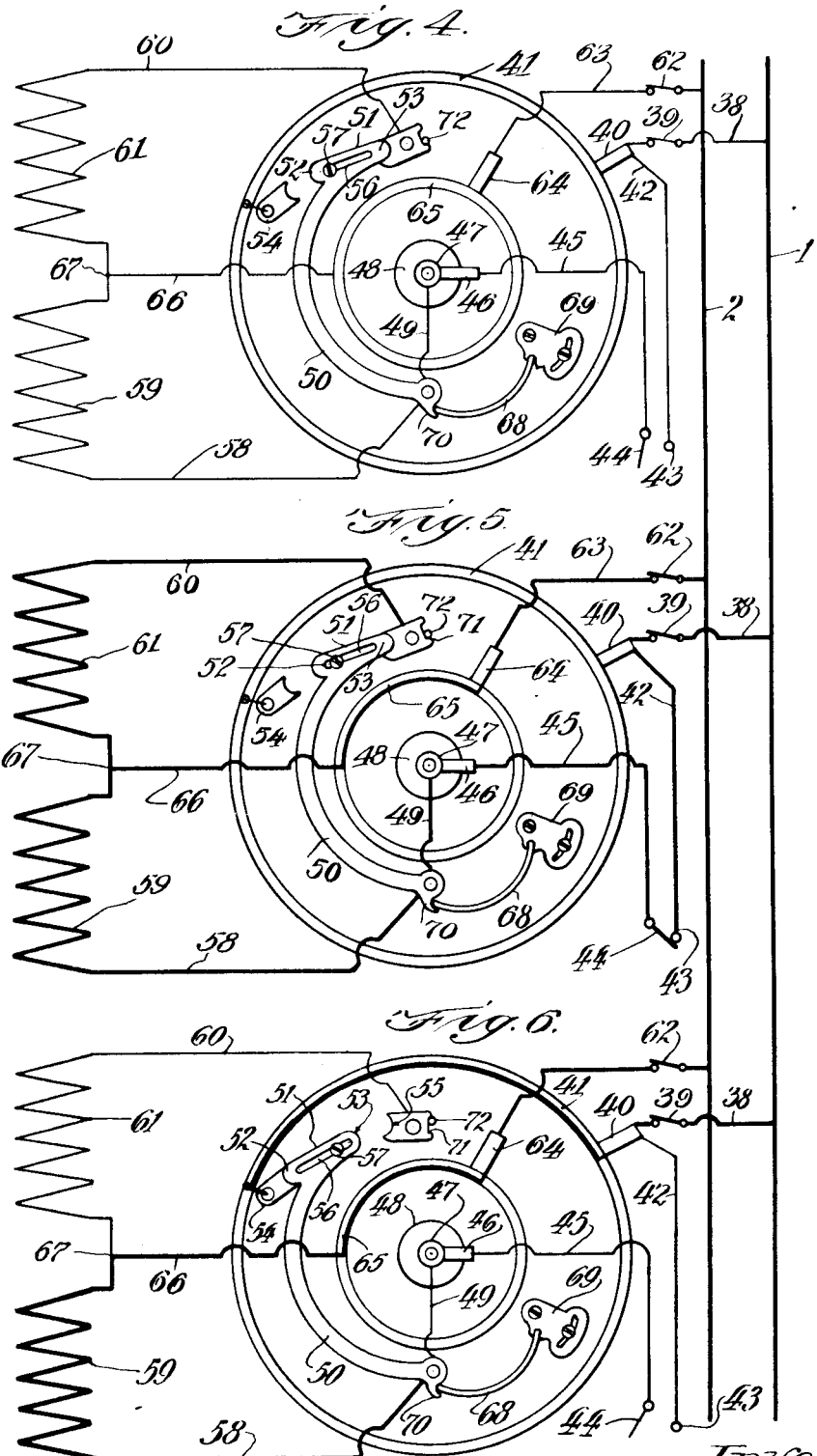

Patented Sept. 8, 1931

1,822,304

UNITED STATES PATENT OFFICE

GEORGE L. MILLER AND JOHN MIKULASEK, OF NEWTON, IOWA, ASSIGNORS TO THE MAYTAG COMPANY, OF NEWTON, IOWA, A CORPORATION OF DELAWARE

SAFETY OVERLOAD GOVERNOR CUT-OUT SWITCH FOR ELECTRIC MOTORS

Application filed July 21, 1928. Serial No. 294,485.

This invention relates to safety overload cut-out for electric motors and more particularly to the provision of such a cut-out and switch to be used in connection with motors of the single phase induction type commonly known as split phase motors. These split phase motors have a stator provided with two windings, one of which may be designated as the starting winding and the other as the running or working winding. The starting winding is used but temporarily when the motor is being started, and is disconnected when the motor reaches a predetermined speed, and thus during the normal operation of the motor, the working or running winding alone is in use.

Among the objects of our invention are to provide a novel construction of a governor that automatically cuts out the electric current passing through an overloaded or stopped motor, and thus prevents any damage to the motor; further to provide a safety device for preventing an overloading of the line feeding the motor; further to provide a novel means and construction of a cut-out with controlling means for starting the motor; further to provide a novel construction of switch and governor mechanism for connecting in the starting winding of the motor and when the motor has reached a predetermined speed, for disconnecting the starting winding and cutting in the working winding.

Further objects are to provide a construction of maximum simplicity, efficiency, economy and ease of operation; and such further objects, advantages and capabilities as will later more fully appear.

Our invention further resides in the combination, construction and arrangement of parts illustrated in the accompanying drawings, and while we have shown therein a preferred embodiment, we desire it to be understood that the same is susceptible of modification and change without departing from the spirit of our invention.

In the drawings:

Figs. 1, 2 and 3 are diagrammatic views disclosing the motor in shut-off, starting and running positions, respectively.

Figs. 4, 5, and 6 are views similar to Figs. 1, 2 and 3, but disclosing a slightly different construction of overload governor cut-out provided with a remote control switch, the figures disclosing the motor in shut-off, starting, and running positions, respectively.

Referring to Figs. 1, 2 and 3 of the drawings, the power line from which the supply current is fed is shown as at 1 and 2, the current from the power line being fed through supply lines 3 and 4, through main switches 5 in the supply lines and then through the brushes 6 and 7 of the motor. The brush 6 is in contacting engagement with a collector ring 8 while the brush 7 makes contact with a collector ring 9. A lead wire 10 connects with the one end of the collector ring 8 to the working winding 11 and starting winding 12 of the motor. A lead wire 13 from the collector ring 9 connects with the arm 14 of the governor. The governor is provided with a cut-out portion 15 adapted to contact with a terminal 16 attached by a lead wire 17 to the outer end of the working winding 11.

The governor 14 is adapted to be moved into or out of engagement with the terminal 16, the governor being thrown out of engagement with the starting winding 12 by means of the centrifugal force exerted upon it when the rotor is rotating. A slot 18 is provided in the contacting end of the rotor of the governor, the governor being limited in its movement by means of a screw 19. A pivotal terminal 20 is connected to a lead wire 21 connecting to the one end of the starting winding 12. This pivotal terminal is provided with an insulated tip 22 having a rounded nose adapted to be in contacting relation with a rounded nose 23 on the governor 14.

In order to start the motor, we provide a plunger 24 positioned in the motor shaft 25. This plunger is provided at its inner end with a reduced tapered portion 26 engaging with a further reduced portion 27 provided at its inner end with a piston 28, which piston is in contacting engagement with a spring 29. This spring 29 normally pushes the plunger outwardly but to prevent the plunger from being forced out of the motor shaft by the spring, a stop pin 30 is provided. This stop pin operates in a groove 31 provided in the outer end of the plunger. A handle 32 on the plunger allows for the manual operation of the same, although automatic means may be provided for forcing the plunger inwardly. An insulated vertical rod 33 normally rests upon the reduced portion 27 of the plunger and at its upper end is in contacting engagement with the lower edge of the swivel or pivotal terminal 20. A spring 34 holds the terminal 20 against the upper end of the insulated rod 33, and normally tends to force the insulated tip 22 upwardly.

When it is desired to start the motor, the main switch 5 is thrown and the plunger 24 is pressed inwardly by the operator. This plunger will force the rod 33 upwardly by means of the tapered portion 26 over which this rod will ride. Thus the plunger will transfer its movement through the rod 33 to the terminal 20. The windings are of higher and lower reactance and the alternating current is subjected to a lag in the winding of the higher reactance and the resulting relative displacement of phase of the two windings produce an irregularly rotating magnetic field causing the rotor to revolve.

When the rotor has reached the normal operating or running speed, the governor 14 is thrown outwardly by centrifugal force breaking the contact between the tip 23 of the governor and the terminal 20. This terminal 20 at this time is in a position shown in either Figs. 1 or 3 of the drawings, the spring 29 pushing the plunger outwardly and allowing the insulated rod to pass downwardly over the inclined surface 26 of the plunger onto the reduced portion 28 as soon as the operator removes the pressure from the handle 32. The spring 34 acting upon the terminal 20, will force the rod 33 downwardly. The centrifugal force acting upon the governor 14, acts against a leaf spring 35 in contacting engagement with an extension 36 on the governor 14, and the other end thereof being in engagement with an adjustable abutting member 37.

When the motor slows down for any reason whatsoever, as by reason of overload, etc., the centrifugal governor will recede and will shut off the working winding and stop the motor. By receding, the connection to the governor is broken with the terminal 16 of the working winding and as the pivoted terminal 20 is in the position shown in either Figs. 1 or 3, the tip 23 of the governor will impinge against and contact with the insulated tip 22 of the terminal 20 and thus there will be an open circuit through either the starting or working winding. In order to again start the motor, it will be necessary to manually operate the plunger and also the switches, provided the switches have been opened. By means of this construction, there is no possibility of the motor being started without again forcing the plunger 24 inwardly so as to make contacting engagement between the terminals of the starting winding.

Figs. 4, 5 and 6 of the drawings disclose an alternate construction of safety overload governor cut-out. In this construction, a lead 38 from the power line 1 is led through a main switch 39 to a brush 40 connected with the collector ring 41 of the motor. A lead line 42 is also connected to the brush 40 and at its other end to a terminal 43. This terminal is adapted to be contacted by means of a remote control switch 44. Connected with this remote control switch is a lead line 45 connected with a brush 46 mounted on a collector rod 47 located in the motor shaft 48, but insulated therefrom. The current flows from the collector rod 47 through a lead line 49 to a governor 50. This governor is provided with a contacting head 51 having rounded tips 52 and 53 adapted to contact with arcuate cut-out portions on the terminals 54 and 55 respectively.

In order that movement of the support 51 may be limited, it is provided with a slot 56 providing a range of movement between the terminals 54 and 55. A pin 57 passing through this slot 56 prevents any displacement of the head. The terminal 54 is connected with the collector ring 41 so that when the tip 52 is in contacting relation with the terminal 54, the current flows through the governor 50, through a lead line 58 and then through one terminal of the working or running winding 59 of the motor. When the tip 53 contacts with the terminal 55, the current flows through the terminal 55 and then through the lead 60 to one terminal of the starting winding 61. The current from the power line 2 passes through a switch 62 and from there through a lead wire 63 to a brush 64 connecting with a collector ring 65. The current from this collector ring 65 passes through a lead wire 66 to the other end of both the working and starting windings as at 67.

To start the motor in this alternate construction, the main switch 39 is closed and then the remote control switch 44 is thrown to allow the current to pass through the lead wire 42, through the control switch 43, and lead wire 45 to the brush, from where it passes through the collector rod 47, through the lead wire 49 to the governor 50. A leaf spring 68 having its one end mounted in a cut-out portion of an adjustable lug or abutting surface 69, contacts with its other end on an extension 70 of the governor, the spring tending normally to throw the governor upward into contacting relation with the terminal 55. This terminal 55 is pivotally supported and at its rear portion is provided with a cut-out 71 providing a cam surface contacting with a pin 72. This pin allows a limited movement of the terminal. The current passing through the terminal 55 then passes through the lead line 60 to one end of the starting winding. The current passing from the power line 2 to the switch 62 and lead line 63 to the brush 64, then passes through the collector ring 65, through the lead line 66 to the outer end of the starting winding and thus closing the circuit.

As the rotor reaches a predetermined speed, the governor, due to the centrifugal force acting thereon, is thrown out of engagement with the terminal 55 and into engagement with the terminal 54. The remote control switch 44 is then thrown open, thus breaking the circuit to the starting winding. The current then flows through the power line 1 through the lead line 38, to the switch 39 and then through the brush 40 and collector ring 41 to the terminal 54. From the terminal 54, the current flows through the governor 50 and then through the lead line 58 to the working winding 59. There is thus a closed circuit through this working winding as the lead line 66 connecting with the outer end of the working or running winding, is always connected through the lead line 66 to the collector ring 65 and to the power line 2 whenever the switch 62 remains closed.

When the speed of the motor has to slow down for any reason whatsoever, the governor will recede and make connection with the terminal 55. Even though the governor again contacts with the terminal 55, the current cannot flow through the starting winding as the circuit is open by reason of the remote control switch having been disconnected or opened. The motor cannot be started until the remote control switch is again closed.

Although we have referred to the safety governor cut-out switch as used in connection with the split single phase induction type motor, we do not thereby wish to limit ourselves to this type of construction as it is applicable for use with different types of electric motors, wherever it is desired to prevent damage to the motor because of an overloading of the motor or the line leading to the motor, or to prevent damage to a motor that has become stalled or stopped for any reason whatsoever.

The switch connections 39 and 62 although shown as separate switches, are usually combined in one switch or connection plug and the switch 44 may be added to such switch and be operative therefrom.

Having thus disclosed the invention, we claim:

1. In an electric motor provided with a starting and a working winding, means including a plunger and a pivotally mounted terminal associated therewith for closing the circuit of the starting winding for starting the motor, a centrifugal governor for disconnecting said starting winding and connecting the working winding when the motor has reached a predetermined speed for normal running operation, and means for breaking said working winding when the speed of said motor has receded, and stopping the motor.

2. In an electric motor provided with a starting and a working winding connected in multiple, terminals therefor, one of said terminals being pivotally mounted, said pivotally mounted terminal provided with an insulated tip, a centrifugal governor normally contacting said insulated tip for opening the electrical circuit through said windings when said motor has receded or stopped.

3. In an electric motor provided with a starting and a working winding connected in multiple, terminals therefor, one of said terminals being pivotally mounted, said pivotally mounted terminal provided with an insulated tip and a recessed portion, a centrifugal governor normally contacting said insulated tip for opening the circuit through said windings, and means for moving said pivotally mounted terminal whereby said governor contacts said recessed portion and the other of said terminals to close the circuit.

4. In an electric motor provided with a starting and a working winding, a shaft, terminals therefor, one of said terminals being pivotally mounted, said pivotally mounted terminal having an insulated portion, a centrifugal governor normally contacting said insulated portion for opening the circuit through said windings, a plunger mounted in said shaft, and means operated by said plunger and adapted to operate said pivoted terminal to close the circuit through said windings for starting the motor.

5. In an electric motor provided with a starting and a working winding, terminals therefor, one of said terminals being pivotally mounted, a centrifugal governor, and a plunger for moving said pivotally mounted terminal into an engagement with said governor for closing the circuit and starting said motor.

6. In an electric motor provided with a starting and a working winding, terminals therefor, one of said terminals being pivotally mounted, a centrifugal governor for closing the circuit to both of said windings, and means for moving said pivotally mounted terminal into an engagement with said governor for closing the circuit to said starting winding for starting the motor.

7. In an electric motor provided with a starting and a working winding, terminals therefor, one of said terminals being pivotally mounted, a centrifugal governor adapted to close the circuit to both of said windings during the initial rotation of said motor and to close the circuit to said working winding when said motor has reached a predetermined speed of rotation, and means including a plunger for moving said pivotally mounted terminal into an engagement with said governor for closing the circuit to said starting winding and starting the motor.

8. In an electric motor, a starting winding, a working winding, terminals for the respective windings, a centrifugal governor normally engaging one of said terminals while the motor is in operation, the other terminal having an insulated portion, and means for normally maintaining contact between said governor and the insulated portion of the last mentioned terminal while the motor is at rest.

9. In an electric motor, a starting winding, a working winding, terminals for the respective windings, a centrifugal governor normally engaging one of said terminals while the motor is in operation, the other terminal having an insulated portion, means for normally maintaining contact between said governor and the insulated portion of the last mentioned terminal while the motor is at rest, and means for moving the last mentioned terminal so as to disengage the governor and said insulated portion to close the circuit to said starting winding and thereby start the motor.

10. In an electric motor, a starting winding, a working winding, terminals for the respective windings, a centrifugal governor normally engaging one of said terminals while the motor is in operation, the other terminal having an insulated portion, means for normally maintaining contact between said governor and the insulated portion of the last mentioned terminal while the motor is at rest, and a plunger mechanism for moving said last mentioned terminal to disengage the governor from said insulated portion, so as to close the circuit to said starting winding and thereby start the motor.

11. In an electric motor, a starting winding, a working winding, terminals for the respective windings, a centrifugal governor normally engaging one of said terminals while the motor is in operation, the other terminal having an insulated portion, means for normally maintaining contact between said governor and the insulated portion of the last mentioned terminal while the motor is at rest, a plunger provided with a tapered portion forming a cam surface, and a rod engaging said last terminal portion and also engaging said plunger, so that said rod will be raised by said tapered portion as said plunger is operated and thereby move the insulated portion of said last mentioned terminal out of engagement with the governor, so as to close the circuit to said starting winding.

In witness whereof, we hereunto subscribe our names to this specification.

GEORGE L. MILLER.
JOHN MIKULASEK.